US005416963A

United States Patent [19]

Boynton

[11] Patent Number: 5,416,963

[45] Date of Patent: May 23, 1995

[54] ARROW TIP REMOVER

[76] Inventor: Edwin J. Boynton, P.O. Box 1108, Green River, Wyo. 82935

[21] Appl. No.: 240,560

[22] Filed: May 11, 1994

[51] Int. Cl.[6] ............ B23P 19/04

[52] U.S. Cl. ............ 29/264

[58] Field of Search ............ 29/264, 256, 263

[56] References Cited

U.S. PATENT DOCUMENTS 4,194,278 3/1980 Sanders ............ 29/264

4,633,562 1/1987 Ulsh ............ 29/264

4,920,625 5/1990 Smith ............ 29/264

5,075,948 12/1991 Maier ............ 29/264

*Primary Examiner*—Robert C. Watson

[57] ABSTRACT

An arrow tip remover for removing field and target arrow tips lodged in objects comprising a sleeve having a tip end and a base end; a bolt having a tip end and a base end with the bolt disposed within the sleeve such that the tip end thereof is extendable from the tip end of the sleeve and the base end thereof is extended from the base end of the sleeve; a coupling mechanism for coupling the tip end of the bolt to an arrow tip; and an extensible mechanism for extending the base end of the bolt away from the base end of the sleeve; whereby when an arrow tip is lodged in an object, coupling the tip end of the bolt to the arrow tip with the coupling mechanism, positioning the tip end of the sleeve against the object, and extending the bolt from the sleeve with the extensible mechanism dislodges the arrow tip.

1 Claim, 3 Drawing Sheets

FIG. 1
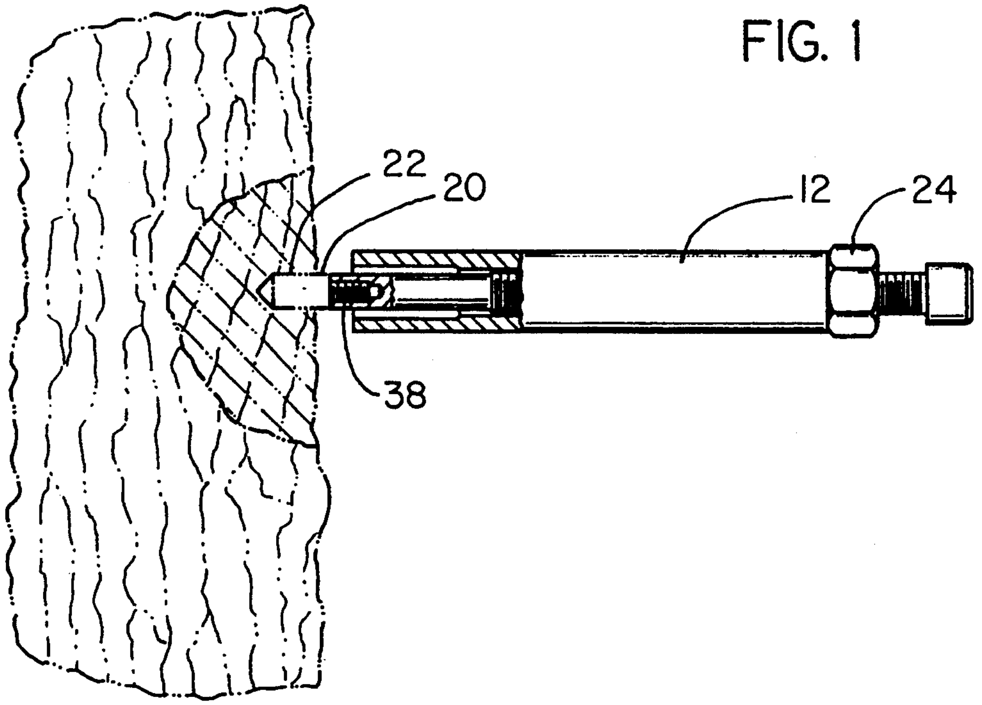
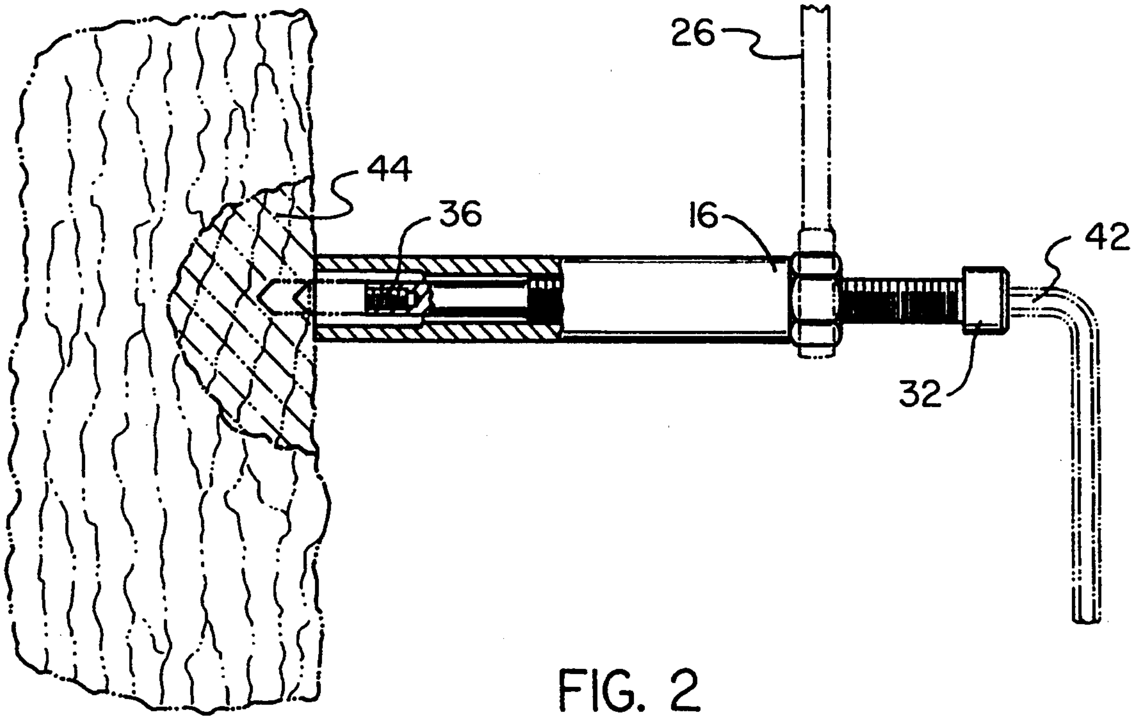
FIG. 2

FIG. 3
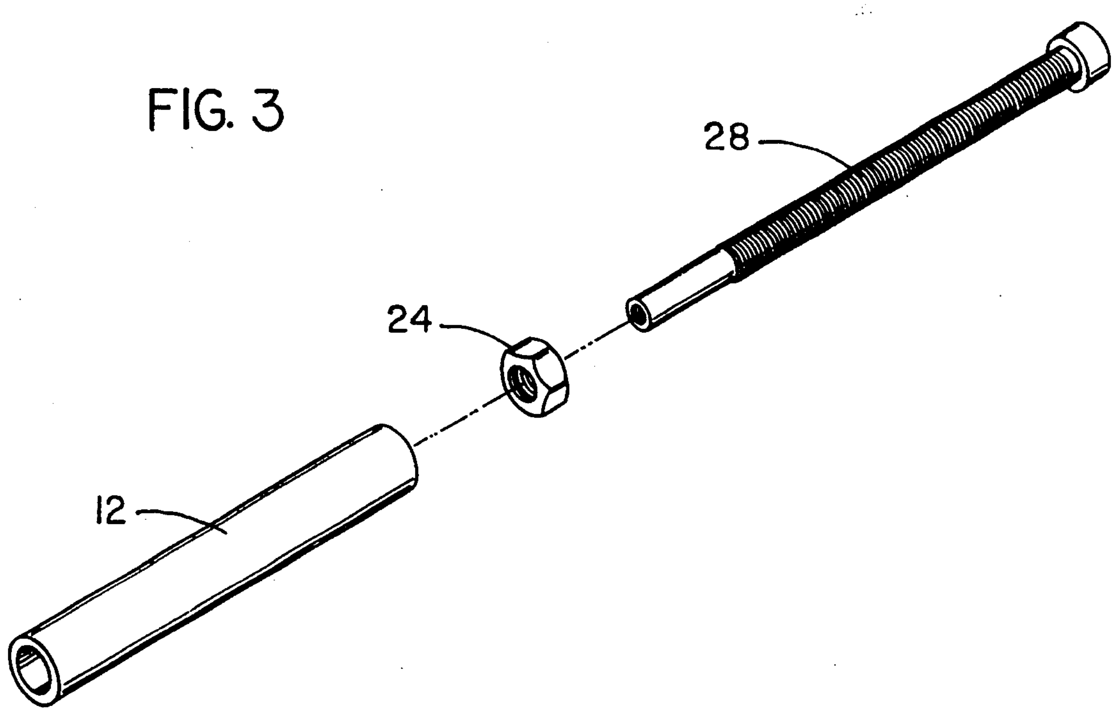
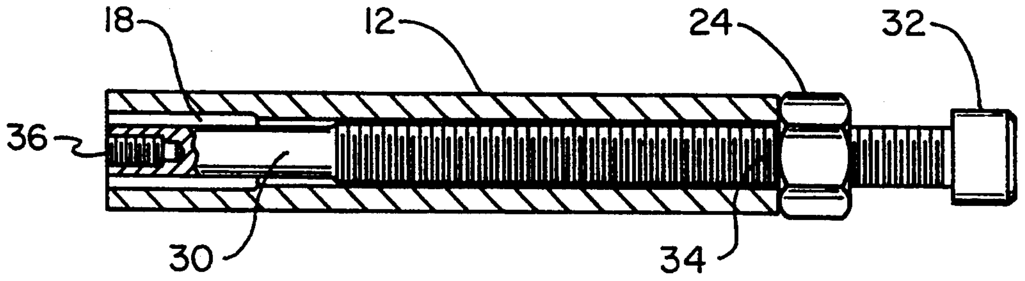
FIG. 4

ARROW TIP REMOVER

BACKGROUND OF THE INVENTION

1. Field of the Invention

The present invention relates to an arrow tip remover and more particularly pertains to removing field and target arrow tips lodged in objects such as boards, trees, and the like with an arrow tip remover.

2. Description of the Prior Art

The use of arrow tip removal tools is known in the prior art. More specifically, arrow tip removal tools heretofore devised and utilized for the purpose of removing arrow tips lodged in objects are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,529,497 to Brooks discloses a dowel removing tool.

U.S. Pat. No. 4,476,598 to Beauregard discloses a combination arrowhead removing and muzzle-loading tool.

U.S. Pat. No. 4,478,204 to Kocsan discloses a system of a bow stabilizer and an embedded arrow head remover.

U.S. Pat. No. 4,748,965 to Ament discloses a combined archery bow stabilizer and embedded arrowhead remover.

U.S. Pat. No. 4,957,095 to Cameron discloses an archery bow stabilizer and embedded arrowhead remover.

U.S. Pat. No. 5,075,948 to Maier discloses a minimum clearance dowel pin extraction tool.

While these devices fulfill their respective, particular objective and requirements, the aforementioned patents do not describe an arrow tip remover that utilizes a simple design of a sleeve in combination with a bolt, coupling mechanism, and extension mechanism for removing arrow tips from objects.

In this respect, the arrow tip remover according to the present invention substantially departs from the conventional concepts and designs of the prior art, and in doing so provides an apparatus primarily developed for the purpose of removing field and target arrow tips lodged in objects such as boards, trees, and the like.

Therefore, it can be appreciated that there exists a continuing need for new and improved arrow tip remover which can be used for removing field and target arrow tips lodged in objects such as boards, trees, and the like. In this regard, the present invention substantially fulfills this need.

SUMMARY OF THE INVENTION

In the view of the foregoing disadvantages inherent in the known types of arrow tip removal tools now present in the prior art, the present invention provides an improved arrow tip remover. As such, the general purpose of the present invention, which will be described subsequently in greater detail, is to provide a new and improved arrow tip remover and method which has all the advantages of the prior art and none of the disadvantages.

To attain this, the present invention essentially comprises, in combination, a rigid and tubular sleeve having a tip end and a base end with the base end having an extended bore formed therein adapted to receive the base end of an arrow tip. A rigid hexagonal nut is included and adapted to receive a wrench. A rigid and elongated bolt is included and has a tip end, a base end, and a threaded portion therebetween. The bolt is disposed within the sleeve and threadably coupled to the nut such that the tip end thereof is extendable from the tip end of the sleeve and the nut is in contact with the base end of the sleeve. The tip end of the sleeve has an axially aligned and threaded bore disposed therein adapted to be coupled with a bolt extended from the base end of an arrow tip. The base end of the sleeve has an axially aligned and hexagonal aperture formed thereon adapted to receive a wrench. When an arrow tip is lodged in an object, threadably coupling the tip end of the bolt to the bolt extended from the base end of an arrow tip, positioning the tip end of the sleeve against the object, and axially extending the base end of the bolt away from the base end of the sleeve dislodges the arrow tip through the application of torquing forces applied with a wrench to the nut in one orientation, to the bolt in a second orientation, and to both the nut and bolt in a third orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved arrow tip remover which has all the advantages of the prior art arrow tip removal tools and none of the disadvantages.

It is another object of the present invention to provide a new and improved arrow tip remover which may be easily and efficiently manufactured and marketed.

It is a further object of the present invention to provide a new and improved arrow tip remover which is of durable and reliable construction.

An even further object of the present invention is to provide a new and improved arrow tip remover which is susceptible of a low cost of manufacture with regard to both materials and labor, and which accordingly is then susceptible of low prices of sale to the consuming public, thereby making such an arrow tip remover economically available to the buying public.

Still yet another object of the present invention is to provide a new and improved arrow tip remover which provides in the apparatuses and methods of the prior art some of the advantages thereof, while simultaneously overcoming some of the disadvantages normally associated therewith.

Even still another object of the present invention is to provide a new and improved arrow tip remover for removing field and target arrow tips lodged in objects such as boards, trees, and the like.

Lastly, it is an object of the present invention to provide a new and improved arrow tip remover comprising a sleeve having a tip end and a base end; a bolt having a tip end and a base end with the bolt disposed within the sleeve such that the tip end thereof is extendable from the tip end of the sleeve and the base end thereof is extended from the base end of the sleeve; coupling means for coupling the tip end of the bolt to an arrow tip; and extensible means for extending the base end of the bolt away from the base end of the sleeve; whereby when an arrow tip is lodged in an object, coupling the tip end of the bolt to the arrow tip with the coupling means, positioning the tip end of the sleeve against the object, and extending the bolt from the sleeve with the extensible means dislodges the arrow tip.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a cross-sectional view of the preferred embodiment of the arrow tip remover constructed in accordance with the principles of the present invention coupled to an arrow tip that is lodged in a tree trunk.

FIG. 2 is a cross-sectional view of the present invention with a torquing action being applied thereto by an opened end wrench on the nut and a hex wrench on the bolt for removing the arrow tip from the tree trunk.

FIG. 3 is an exploded perspective view of the present invention shown in FIG. 1.

FIG. 4 is a cross-sectional view of the present invention of FIG. 1.

The same reference numerals refer to the same parts through the various Figures.

DESCRIPTION OF THE PREFERRED EMBODIMENT

Figure 5:
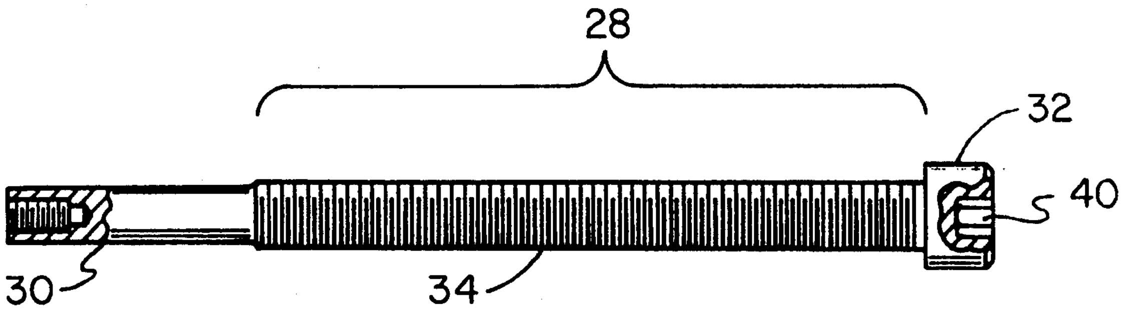
FIG. 5 is a cross-sectional view of the bolt of the present invention.
Figure 6:
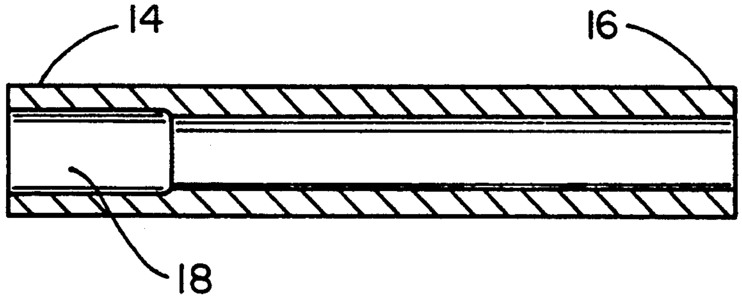
FIG. 6 is a cross-sectional view of the sleeve of the present invention.

With reference now to the drawings, and in particular, to FIG. 1 thereof, the preferred embodiment of the new and improved arrow tip remover embodying the principles and concepts of the present invention and generally designated by the reference number 10 will be described.

Specifically, the present invention includes 3 major components. The major components are the sleeve, nut, and bolt. These components are interrelated to provide the intended function.

More specifically, it will be noted in the various Figures that the first major component is the sleeve 12. The sleeve is rigid and tubular in structure. It has a tip end 14 and a base end 16. The tip end 14 has an extended bore 18 formed therein adapted to receive the base end 20 of an arrow tip 22. The bore insures proper positioning of the arrow tip for removal thereof from an object. The bore insures that forces used to dislodge the arrow tip remain directed along the central axis of the sleeve. The tip end of the sleeve also provides a stationary foundation for the removal process.

The second major component is the nut 24. The nut is rigid and hexagonal in structure. It has a threaded portion formed therein. The outer portion of the nut is adapted to receive an opened-end wrench 26 or the like. The nut serves as an input mechanism for receiving and transmitting external torquing forces applied by the opened-end wrench to the other major components.

The third major component is the bolt 28. The bolt is rigid and elongated in structure. The bolt has a tip end 30 and a base end 32. A threaded portion 34 is extended between the tip end and the base end. The bolt is disposed within the sleeve 12 and threadably coupled to the nut 24 such that the tip end 30 thereof is extendable from the tip end 14 of the sleeve and the nut 24 is in contact with the base end 16 of the sleeve. The base end 32 of the bolt is extended from the nut at a position remote from the contact between the nut and the sleeve. The tip end 30 of the bolt has an axially aligned and threaded bore 36 disposed therein. This threaded bore is adapted to be coupled with a bolt 38 extended from the base end 20 of an arrow tip 22. This bolt 38 is exposed when the shaft of an arrow is removed from the arrow tip. The base end 32 of the bolt has an axially aligned and hexagonal aperture 40 formed thereon. This hexagonal aperture is adapted to receive a hexagonal wrench 42 or the like therein. The base end an accompanying aperture serves as an input mechanism for receiving and transmitting external torquing forces applied by the hexagonal wrench to the other major components. The external surface of the base end can also be formed in a configuration adapted to receive an opened-end wrench, a socket wrench, or the like for applying torquing forces.

When an arrow tip 22 is lodged in an object 44, several steps are followed in order to remove the lodged arrow tip. First, the shaft of the arrow is removed to expose the bolt 38 on the arrow tip. Second, the tip end 30 of the bolt is coupled to the bolt 38 extended from the base end 20 of the arrow tip 22. Third, the tip end 14 of the sleeve is positioned against the object 44. Fourth, the base end 32 of the bolt 28 is axially extended away from the base end 16 of the sleeve 12 to pull and dislodge the arrow tip. This extension is accomplished through the application of torquing forces. In one orientation, torquing forces can be applied to tighten the nut 24 with an opened-end wrench 26. In a second orientation, torquing forces can be applied to tighten the bolt 32. This is accomplished by inserting a hexagonal wrench 42 into the aperture 40 of the base end 32 of the bolt. In a third orientation, both the opened-end wrench and hexagonal wrench can be used to tighten the nut and bolt for removing an arrow tip.

In the preferred embodiment, the major components are made of steel or a similar rigid material. The sleeve is about 3 inches long. The sleeve has about a 5/16 inch inside diameter. The extended bore of the sleeve is enlarged to about 11/32 of an inch. The nut is about ½ inch in diameter. The bolt is about 4 inches long. The bolt has an outer diameter of about 13/64 inches. The aperture on the tip end of the bolt is sized with about a 5/16 inch diameter. The intermediate portion of the bolt is drilled and tapped for a size #8 bolt with 32 threads per inch. The nut is formed to accommodate a ½ inch opened end wrench. The hexagonal aperture on the base end of the bolt is adapted to receive a ¼ inch socket wrench. The present invention can also be formed with different dimensions other than those indicated in order to accommodate different types of arrow tips and wrenches.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An arrow tip remover for removing field and target arrow tips lodged in objects such as boards, trees, and the like comprising, in combination:

a rigid and tubular sleeve having a inside diameter, a tip end, and a base end, the base end having an extended bore having a circular cross section formed therein adapted to receive the base end of an arrow tip and wherein the diameter of the extended bore is about 10% greater than the inside diameter;

a rigid hexagonal nut adapted to receive a wrench; and a rigid and elongated bolt having a length that is about 33 percent greater than the sleeve, a tip end, base end, and threaded portion therebetween with the bolt disposed within the sleeve and threadably coupled to the nut such that the tip end thereof is extendable from the tip end of the sleeve and the nut is in contact with the base end of the sleeve, the tip end having an axially aligned and threaded bore disposed therein adapted to be coupled with a bolt extended from the base end of an arrow tip, and the base end having an axially aligned and hexagonal aperture formed thereon adapted to receive a wrench;

whereby when an arrow tip is lodged in an object, threadably coupling the tip end of the bolt to the bolt extended from the base end of an arrow tip, positioning the tip end of the sleeve against the object, and axially extending the base end of the bolt away from the base end of the sleeve dislodges the arrow tip through the application of torquing forces applied with a wrench to the nut in one orientation, to the bolt in a second orientation, and to both the nut and bolt in a third orientation.

* * * * *